United States Patent Office 3,000,449
Patented Sept. 19, 1961

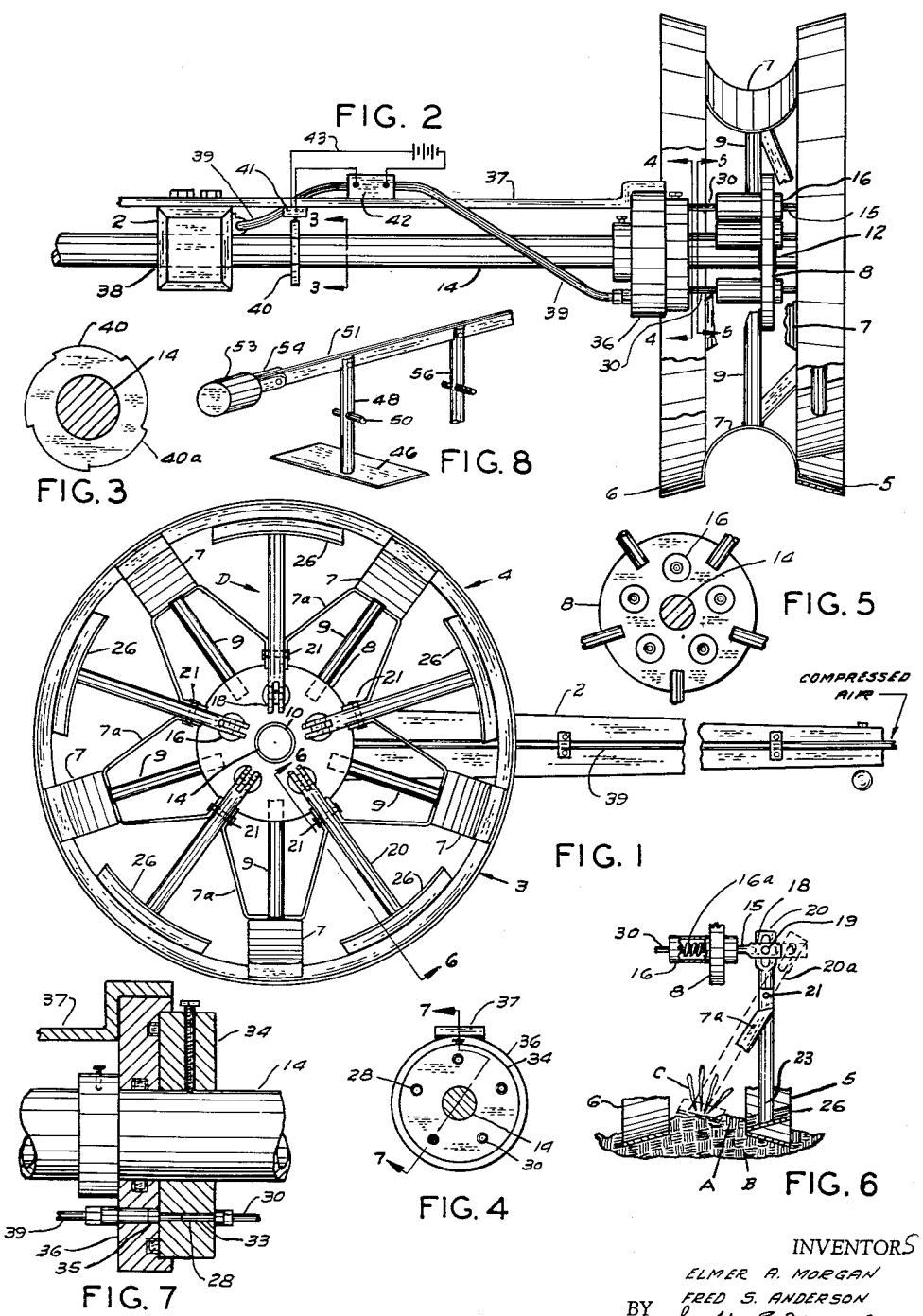

3,000,449
COTTON CHOPPING MACHINE
Elmer A. Morgan, 3621 N. 38th St., and Fred S. Anderson, 2143 W. Marshall, both of Phoenix, Ariz.
Filed Oct. 24, 1960, Ser. No. 64,528
2 Claims. (Cl. 172—94)

This invention concerns a mechanical cotton chopper.

As is well known, cotton is planted commercially by placing the seed in the top center of raised lands which are formed between furrows. It has been found necessary to plant the cotton seeds with a drill quite close together and then roll the soil over the seeds thus planted. The cotton plants grow from these seeds in due time and are necessarily too thick. Heretofore it has been the practice to chop out the unwanted plants so that the remaining plants, thinned by this chopping, will have proper room to grow. This is necessarily a primitive back breaking chore and attempts have been made to chop the unwanted plants out by mechanical means. However, so far as these inventors know machines heretofore made have not actually chopped the cotton but have uprooted certain plants at intervals along the row and in doing this have disturbed the plants remaining by loosening the soil excessively around the roots and by removing too much of the soil from the land.

In view of the foregoing, one of the objects of this invention is to provide a cotton chopping machine which will automatically and mechanically chop out and remove excessive surplus or unwanted cotton plants from the row and leave other plants undisturbed and in good growing condition.

Another object is to provide a split wheel which will straddle the top portion of the row and which is provided with an arcuate knife which will cut transversely of the row to remove cotton plants at predetermined intervals by a quick incisive cutting action while it will leave the plants to be matured undisturbed.

Another object is to provide a cotton chopping machine which consists principally of a cutting wheel which has a split rim; said split rim being adapted to run on each side of a cotton row and permit the cotton plants growing therein to protrude up through the split in the rim while an arcuate knife swings transversely of the row to cut and remove predetermined portions of the row of growing plants; said knife being operated by pneumatic mechanism carried on the hub of the wheel and operated by pneumatic mechanism and electrical control position on stationary parts of the machine frame adjacent the split wheel axle.

Other objects will appear hereinafter.

I attain the foregoing objects by means of the peculiar construction and devices, and parts and combinations of parts shown in the accompanying drawings, in which—

FIGURE 1 is a side elevational view of the split wheel portion of a cotton chopper embodying our invention;

FIGURE 2 is a partial rear view thereof;

FIGURE 3 is an elevational view of the control cam wheel used to determine the air impulses that drive the chopping mechanism;

FIGURE 4 is a sectional view taken substantially on line 4—4 of FIGURE 2 and showing details of the intermittent air feed mechanism;

FIGURE 5 is a similar sectional view taken substantially on line 5—5 of FIGURE 2;

FIGURE 6 is a fragmentary sectional view of portions of the split rim; and

FIGURE 7 is a mid-sectional view of the split rim wheel hub showing one of the air channels in registering position.

FIG. 8 shows a modification of the cotton chopper adaptable for mounting between wheels of a cotton chopping machine.

Similar numerals refer to similar parts in the several views.

It is to be understood that the chopper wheel herein concerned is attached to an implement that will follow down rows on each side of a plant in which cotton seeds have been planted and germinated. As shown in FIGURE 1, only a draw bar 2 is shown to indicate that the wheel 3 is held upright and drawn down along the row of cotton plants between the two furrows on either side thereof.

The wheel has a split or double rim 4 which consists of the two parts 5 and 6. These two parts are held together by inwardly curved arcuate braces 7. These are positioned at predetermined points around the circumference of the wheel rim 4. These braces are connected to a hub 8 by joining brackets 7a and radial portions 9. The hub is provided with a central hole 10 to bear and turn on the outer portion 12 of shaft 14.

On the hub there are a plurality of air cylinders 16, each containing a piston having a piston rod 15 as shown in FIGURE 2. These piston rods 15 are disposed radially outward from the hub. The outer ends of the piston rods 15 are provided with clevis type fittings 18 which are connected to the upper ends of each of the cutter blade handles 20 by pins 19. The cutter blade handles are pivotally supported at 21 on bracket portions 7a of the hub 8, as shown particularly in FIGURE 6. This pivotal support means permits the lower end 23 of the cutter blade handles 20 to carry the cutter blade, or knife 26 in an arcuate swinging motion, so that the blade 26 on each handle 20 will carry through the top A of the earth land B and thereby cut the unwanted cotton plants C cleanly off at approximately the level of the earth.

Air entering the supply pipe 30 introduces compressed air through registering holes 28 in air distributing hub disk 34 into each of the cylinders 16. The piston rod 15 of each cylinder is pushed outward when its pipe 30, connected through hole 28 comes in register with opening 35 in stationary disk 36 on shaft 14. This causes the upper end 20 of each blade handle to move outward and assume the position shown by dotted lines 20a, FIGURE 6. This motion is termed the cutting stroke. Thereafter, as the wheel 3 rotates air escapes from behind the piston in each cylinder 16 after it has been pushed outward and permits the blade handle and blade to fall and assume the precutting position, as shown in solid lines in FIGURE 6. A spring 16a within each cylinder 16 aids in returning the rods 15 to the unextended position. Stationary disk 36 is held in position by brace 37 which extends parallel with shaft 14 outward from frame member 2. Opening 35 in disk 36 is connected to air supply pipe 39.

As shaft 14 turns it also rotates the cam 40. This cam has lobes 40a which make electrical contact element or switch box 41 and wires 43 connected to the electrical solenoid operated air valve 42. These contacts are timed to coincide with the registering position of holes 28 with hole 35 and with the cutting position of the blades 26 on wheel 3. As the wheel turns, to bring one of the cutting units D to the lowermost portion of its travel, the holes through which air is supplied to cylinder 16 of this particular chopping unit are in register and at the same time air is released by valve 42. The air, in turn, operates the piston and piston rod within cylinder 16 and these, in turn, swing the knife blade 26 in the manner above described to chop out the predetermined portion of the cotton plants from the row.

In the modified form shown in FIGURE 8 the blade 46 is attached to the handle 48. The handle swings on pin 50 which is attached to the frame. This may either be a wheel or it may be a stationary part of the machine. The blade is actuated by the pull of rod 51 as produced by the cylinder 53 attached by clevis 54 to the left end of the rod 51. A swingable support 56 supports the opposite end of rod 51. This form of the device is intended to operate between wheels or other mobile supports and is not necessarily included within the rim of a wheel.

Where as only one chopping unit has been described above, it is to be understood that any convenient number of units may be arranged around the inside of wheel 4. In the arcuate peripheral spaces between the blades 26 the cotton plants are left standing to grow to maturity.

The frame part 2 may be supported on or attached to any movable farm implement that can be drawn or moved down the rows and ditches in a cotton field. Compressed air controlled by the electrically operated valve 42 is shown as one way of applying power to knives or blades 26. Note that as hub 8 turns air leaks out of each cylinder 16 through holes 28 in disk 36 which are not in register with opening 35.

We claim:

1. A cotton chopping machine having a wheel to run along an earth row including a row of cotton plants, said wheel having a hub and a split rim with an outside part running on one side of said row and the inside part running on the opposite side of said row so that cotton plants extend upward through the space between said rims, said wheel parts being held together in an axial alignment by inwardly curved arcuate braces joined to said hub by radially extending brackets, a plurality of cotton chopping knives having arcuately curved blades, substantially conforming with the curve of the inside of said rim parts, radially disposed handles swingably supporting said knives on said brackets so that said knives swing through said rims and cut cotton plants protruding into said wheel through the space between said rim parts, and power driven mechanism within said wheel to swingably operate said blades to cut said plants as the wheel runs along said row, consisting of cylinders having pistons and piston rods operative therein, supported within said wheel, said piston rods being pivotally connected to the handles supporting said knives, and mechanism for providing a charge of compressed air to the cylinder when in the lowermost portion of its rotation.

2. A cotton chopping machine having a frame, a wheel axle journalled on said frame, a wheel on said axle disposed to run along an earth row including a row of cotton plants, said wheel having a hub and a split rim with an outside part running on one side of said row and the inside part running on the opposite side of said row so that cotton plants extend upward through the space between said rims, said wheel parts being held together in an axial alignment by inwardly curved arcuate braces joined to a hub by radially extending brackets, a plurality of cotton chopping knives having arcuately curved blades, substantially conforming with the curve of the inside of said rim parts, radially disposed handles swingably supporting said knives on said brackets so that said knives swing through said rims and cut cotton plants protruding into said wheel through the space between said rim parts, and power driven mechanism within said wheel to swingably operate said blades to cut said plants as the wheel runs along said row, consisting of cylinders having pistons and piston rods operative therein, supported within said wheel, said piston rods being pivotally connected to the handles supporting knives, and mechanism for providing a charge of compressed air to the cylinder in the lowermost portion of its rotation, said mechanism including a cam on the axle supporting said wheel, and an insulated contact element on said frame disposed to contact lobes on said cam and thereby complete an electrical circuit through an electrically operated air valve, and an air supply pipe for said cylinder having an electrically operated air valve controlled by said cam.

References Cited in the file of this patent

UNITED STATES PATENTS

| 805,908 | Gilleland | Nov. 28, 1905 |
| 843,460 | Hurst | Feb. 5, 1907 |